(12) United States Patent
Nakano et al.

(10) Patent No.: US 9,884,673 B2
(45) Date of Patent: Feb. 6, 2018

(54) OUTBOARD MOTOR SWITCH DEVICE HAVING REMOTE HANDSET SYSTEM

(71) Applicant: SUZUKI MOTOR CORPORATION, Hamamatsu-Shi, Shizuoka (JP)

(72) Inventors: Yohei Nakano, Hamamatsu (JP); Toshiya Kataoka, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 0 days.

(21) Appl. No.: 15/212,426

(22) Filed: Jul. 18, 2016

(65) Prior Publication Data

US 2017/0021905 A1 Jan. 26, 2017

(30) Foreign Application Priority Data

Jul. 24, 2015 (JP) .................................. 2015-146785

(51) Int. Cl.
*B63H 21/21* (2006.01)
*B63H 20/00* (2006.01)
*G05G 1/04* (2006.01)
*B60R 25/04* (2013.01)

(52) U.S. Cl.
CPC .......... *B63H 21/213* (2013.01); *B63H 20/00* (2013.01); *G05G 1/04* (2013.01); *B60R 25/04* (2013.01); *B63H 2020/003* (2013.01); *B63H 2021/216* (2013.01)

(58) Field of Classification Search
CPC .......... B63B 2017/0009; B63H 21/21; B63H 21/213; B63H 2021/216; B60R 25/2063
See application file for complete search history.

(56) References Cited

U.S. PATENT DOCUMENTS

| 7,290,416 B2 * | 11/2007 | Ohtaki | .................... B60R 25/04 |
| | | | 200/43.08 |
| 2011/0137500 A1 * | 6/2011 | Shinogi | .................... B63J 99/00 |
| | | | 701/21 |

FOREIGN PATENT DOCUMENTS

JP        2012001026 A        1/2012

* cited by examiner

*Primary Examiner* — Andrew Polay
(74) *Attorney, Agent, or Firm* — Troutman Sanders LLP

(57) ABSTRACT

A switch device includes an ENT switch for allowing a keyless controller to perform an authentication process, a S/S switch for manipulating start and stop of an engine, and a single common manipulating member for allowing a user to manipulate ON/OFF switching operations of the ENT switch and the S/S switch. The ENT switch and the S/S switch are switched between ON and OFF depending on a motion of the single common manipulating member.

5 Claims, 8 Drawing Sheets

OUTBOARD MOTOR SWITCH DEVICE HAVING REMOTE HANDSET SYSTEM

CROSS-REFERENCE TO RELATED APPLICATIONS

This application is based upon and claims the benefit of priority of the prior Japanese Patent Application No. 2015-146785, filed on Jul. 24, 2015, the entire contents of which are incorporated herein by reference.

BACKGROUND OF THE INVENTION

Field of the Invention

The present invention relates to an outboard motor switch device having a remote handset system, and more particularly, to an outboard motor switch device having a switch for authentication of the remote handset system and a switch for manipulating start and stop of an engine.

Description of the Related Art

In the prior art, a remote control unit for manipulating an outboard motor having an engine (internal combustion engine) as a driving source is provided with a start/stop switch for manipulating start and stop of the engine. In general, the start/stop switch is a switch necessitating a mechanical key in manipulation, such as a switch operated in combination with a pin cylinder lock.

Meanwhile, the outboard motor remote control unit having the remote handset system is provided with an entry switch for allowing the remote handset system to perform authentication in addition to the start/stop switch described above. In this case, a switch activated without a mechanical key (that does not necessitate a mechanical key for manipulation) is employed in the start/stop switch and the entry switch. In addition, the outboard motor remote control unit having the remote handset system is provided with an emergency power switch that supplies power to an engine control module (ECM) when a portable unit or an electronic key used for authentication is absent. As the emergency power switch, a switch activated by the use of a mechanical key (that necessitates a mechanical key for manipulation) is applied in order to prevent theft of the outboard motor.

In this manner, the outboard motor remote control unit having the remote handset system is provided with three switches including the entry switch, the start/stop switch, and the emergency power switch. In addition, a switch activated without a mechanical key is applied to the entry switch and the start/stop switch, and a switch activated by the use of a mechanical key is applied to the emergency power switch. Therefore, the outboard motor remote control unit having the remote handset system necessitates a key-mounted single-contact switch and a keyless two-contact switch (two-position switch).

However, the outboard motor remote control unit of the prior art called a side-mount remote controller is provided with a throttle, a selector, a main switch embedded with a power switch and a start/stop switch, and an emergency stop switch. For this reason, it is difficult to guarantee an arrangement space for another switch such as an entry switch for allowing an entry operation of the remote handset system. Therefore, it is difficult to apply the remote handset system to an outboard motor that uses a remote control box, called a side-mount remote controller.

As a configuration for manipulating a plurality of switches using a single control knob, Patent Document 1 discusses a configuration for manipulating a plurality of outboard motors using a single ignition switch. However, Patent Document 1 fails to discuss a configuration for manipulating both a switch activated by the use of a key and a switch activated without a key using a common control knob. In addition, since the configuration discussed in Patent Document 1 cannot be applied to the switch activated without a key, it cannot be applied to the outboard motor having the remote handset system.

Patent Document 1: Japanese Laid-open Patent Publication No. 2012-1026

SUMMARY OF THE INVENTION

In view of the aforementioned problems, it is therefore an object of the present invention to save an arrangement space for the entry switch and the start/stop switch.

According to an aspect of the invention, there is provided an outboard motor switch device having a remote handset system, including: an entry switch configured to allow the remote handset system to perform an authentication process; a start/stop switch configured to manipulate start and stop of an engine; and a single common manipulating member configured to perform a manipulation for an ON/OFF switching operation of the entry switch and a manipulation for an ON/OFF switching operation of the start/stop switch, wherein the entry switch and the start/stop switch are switched between ON and OFF depending on a motion of the single common manipulating member.

In the outboard motor switch device having the remote handset system described above, the switch device may further have an emergency power switch switched between ON and OFF on the basis of a rotation of the single common manipulating member. In addition, the entry switch may be a switch switched between ON and OFF on the basis of a rotation of the single common manipulating member, and an operational direction of the single common manipulating member may be different between the ON/OFF switching operation of the entry switch and the ON/OFF switching operation of the emergency power switch.

In the outboard motor switch device having the remote handset system described above, the entry switch may be a switch switched between ON and OFF on the basis of a rotation of the manipulating member, and the start/stop switch may be a switch switched between ON and OFF on the basis of a rectilinear motion of the manipulating member.

In the outboard motor switch device having the remote handset system described above, the start/stop switch may not be switched from OFF to ON even in a rectilinear motion of the manipulating member when the manipulating member is rotated to set the entry switch to ON.

In the outboard motor switch device having the remote handset system described above, the start/stop switch may be switched between ON and OFF in response to a rectilinear motion of the manipulating member when the manipulating member is rotated to set the emergency power switch to ON.

In the outboard motor switch device having the remote handset system described above, the switch device may further include a pin cylinder lock having an outer cylinder, and an inner cylinder provided with a keyhole where a mechanical key can be inserted or removed and rotatably housed in the outer cylinder. In addition, the manipulating member may include the inner cylinder. Furthermore, the inner cylinder may be allowed to rotate in one predetermined direction from a mechanical key insertable/removable position and may not be allowed to rotate oppositely to the one predetermined direction when the mechanical key is not inserted into the keyhole. Moreover, the inner cylinder may be allowed to rotate in the opposite direction from the insertable/removable position when the key is inserted into the keyhole, and the entry switch may be switched from OFF to ON when the inner cylinder is rotated in the one predetermined direction from the mechanical key insertable/removable position, and the emergency power switch may be switched from OFF to ON when the inner cylinder is rotated in the opposite direction from the mechanical key insertable/removable position.

The outboard motor switch device having the remote handset system described above may further have a control knob detachably installed in the inner cylinder to cover the keyhole and rotate in synchronization with the inner cylinder.

The outboard motor switch device having the remote handset system described above may further have a removal prevention mechanism for preventing the control knob from being removed from the inner cylinder.

In the outboard motor switch device having the remote handset system described above, the removal prevention mechanism may have a trench-shaped locking concave portion provided in any one of the cylinder lock and the control knob and a locking convex portion provided in the other one lockably to the locking concave portion.

DETAILED DESCRIPTION OF THE PREFERRED EMBODIMENTS

Preferred embodiments of the present invention will now be described with reference to the accompanying drawings. A switch device according to this embodiment has a start/stop switch, an entry switch, and an emergency power switch integrated into a single body. In addition, the switch device according to this embodiment is provided in a remote control box used by a user (such as a ship operator) to manipulate an outboard motor. For simplicity purposes, the start/stop switch will be referred to as an "S/S switch," the entry switch will be referred to as an "ENT switch," and the emergency power switch will be referred to as an "EMA switch."

<Entire Configuration of Ship and Outboard Motor>

Figure 1:
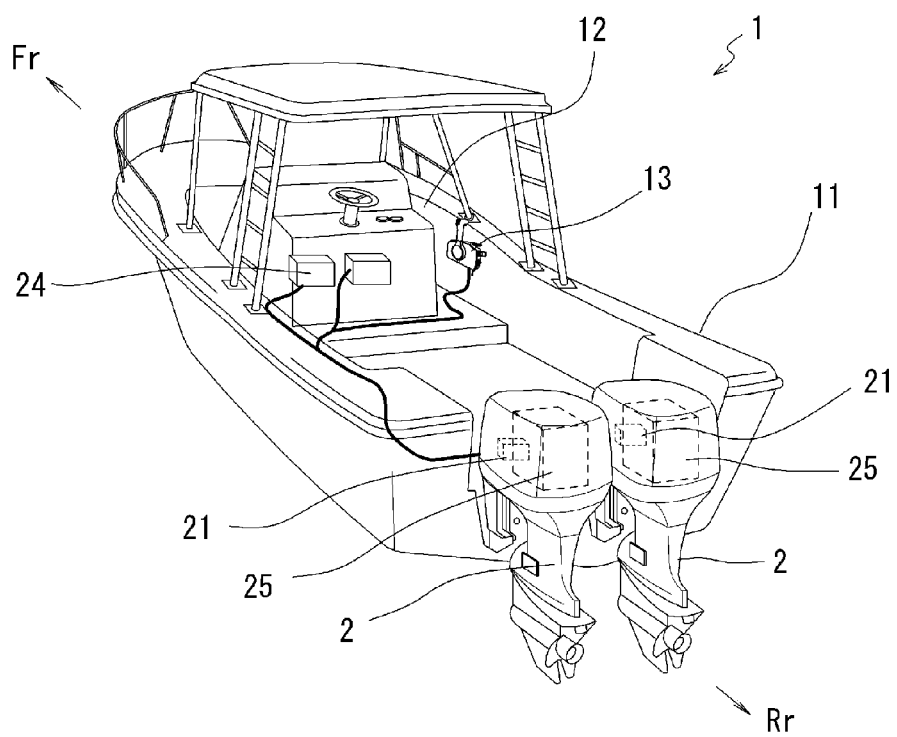
FIG. 1 is a diagram schematically illustrating a ship provided with an outboard motor.

FIG. 1 is a diagram schematically illustrating a ship 1 provided with an outboard motor 2. As illustrated in FIG. 1, the outboard motor 2 is installed in a transom placed in a rear part of a hull 11 of a ship 1 using a bracket device. Although a pair of outboard motors 2 is installed in the configuration of FIG. 1, the number of the outboard motors 2 installed in the ship 1 is not particularly limited. Each outboard motor 2 is mounted with an engine 25 (internal combustion engine) as a driving power source, an engine control module (ECM) 21 configured to control the engine 25, and a starter motor 22 configured to start the engine 25 under control of the ECM 21 (refer to FIG. 3. The starter motor 22 is omitted in FIG. 1). In addition, a cabin is provided in a front deck of the hull 11 of the ship 1. A remote control box 13 for allowing a user (ship operator) to operate the outboard motor 2 is provided on a wall face of the indoor of the cabin 12. In addition, the ship 1 is installed with a battery 24. Furthermore, the battery 24, the remote control box 13, and the ECM 21 are connected to each other in order to supply electric power from the battery 24, for example, through a cable. Note that the configuration known in the art may be applied to the outboard motor 2 and the ECM 21 provided in the outboard motor 2, and thus they will not be described herein.

<Configuration of Remote Control Box>

Figure 2:
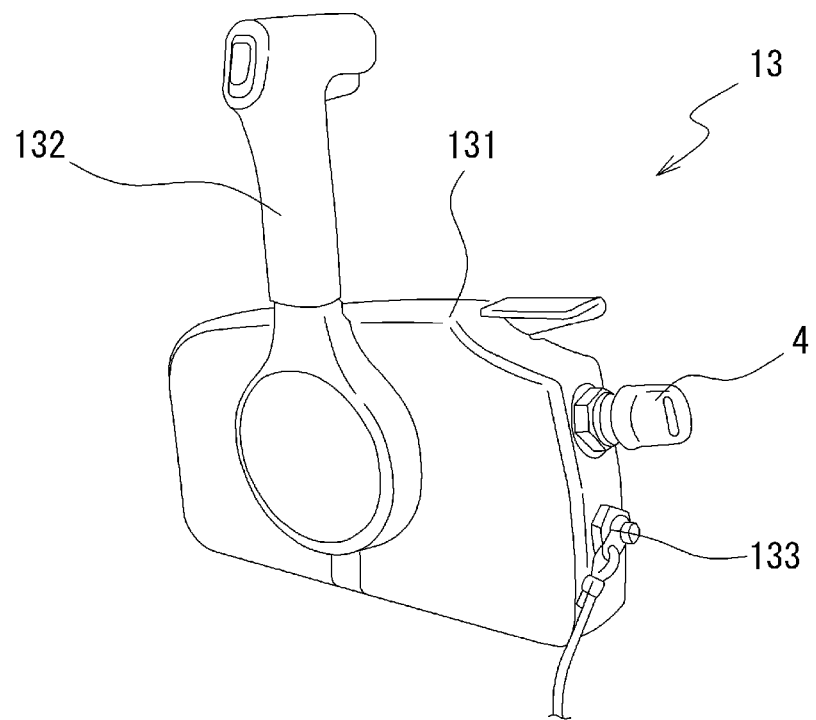
FIG. 2 is a diagram schematically illustrating an exemplary configuration of a remote control box.

FIG. 2 is a diagram schematically illustrating an exemplary configuration of the remote control box 13. According to this embodiment, a side-mount type remote control box installed on a wall face (vertical surface) of the ship 1 for use is illustrated as the remote control box 13. As illustrated in FIG. 2, the remote control box 13 has a remote controller housing 131, a remote control lever 132, a switch device 4 according to this embodiment, and an emergency stop switch 133. Note that the side-mount type remote control box may also be referred to as a "side-mount remote controller."

The remote control lever 132 is provided in the remote controller housing 131 tiltably (rotatably) in a front-rear direction. The emergency stop switch 133 is provided on a rear side face of the remote controller housing 131. The emergency stop switch 133 is a switch having an insertable/removable lock plate and is switched between ON and OFF by inserting and removing the lock plate. The ECM 21 is operated to stop the engine 25 of the outboard motor 2 when it is detected that the lock plate is extracted from the emergency stop switch 133. Note that a configuration known in the art may be applied to the remote control lever 132 and the emergency stop switch 133, and they will not be described herein.

<Configuration of Remote Handset System>

Figure 3:
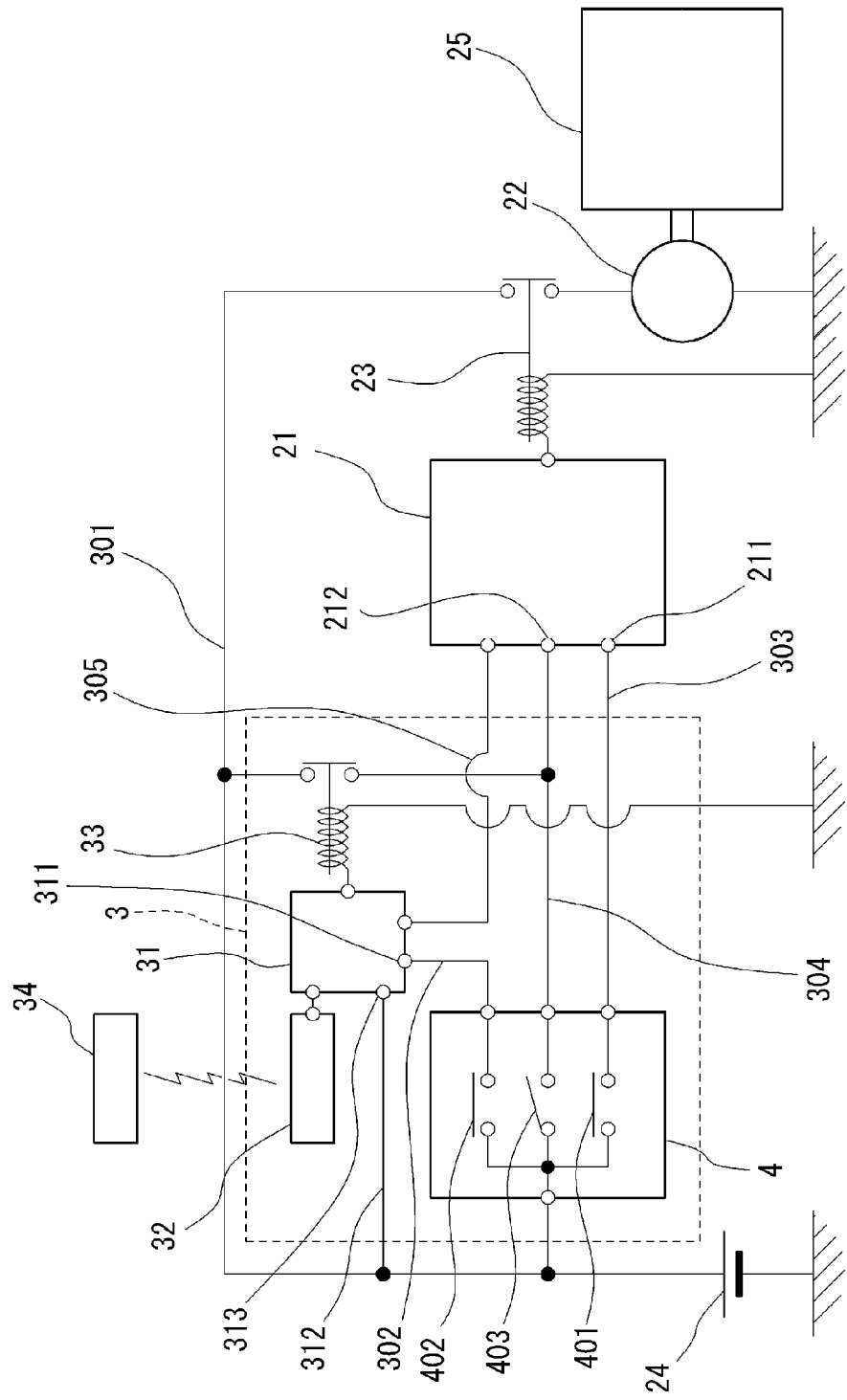
FIG. 3 is a block diagram illustrating a remote handset system and a configuration for starting and stopping an engine of the outboard motor out of a control system of the outboard motor.

FIG. 3 is a block diagram illustrating a remote handset system 3 and a configuration for starting and stopping the engine 25 of the outboard motor 2 out of the control system of the outboard motor 2. The remote handset system 3 of the outboard motor 2 activates the ECM 21 by using a portable unit or an electronic key capable of wirelessly transmitting (radio transmission) ID information (hereinafter, referred to as a "portable unit and the like 34") without a mechanical key to transition to a controllable state of the engine 25. As illustrated in FIG. 3, the remote handset system 3 of the outboard motor 2 has a keyless controller 31, a radio communication unit 32, an ECM power relay switch 33, and the switch device 4 according to this embodiment. Furthermore, the switch device 4 according to this embodiment has an S/S switch 401 (start/stop switch), an ENT switch 402 (entry switch), and an EMA switch 403 (emergency power switch). Note that, although described below, the S/S switch 401 and the ENT switch 402 of the switch device 4 are switches switchable between ON and OFF without a mechanical key 501 suitable for the pin cylinder lock 5. In contrast, the EMA switch 403 is a switch not switched between ON and OFF without a suitable mechanical key 501 (a switch necessitating a suitable mechanical key 501 in order to switch between ON and OFF).

The keyless controller 31 executes an authentication process described below. The keyless controller 31 is a computer having a central processing unit (CPU), a read-only memory (ROM), and a random access memory (RAM). The ROM stores a computer program for executing the authentication process or various setup data or information for executing the authentication process in advance. The CPU reads the computer program stored in the ROM and executes the program by using the RAM as a work area. As a result, the authentication process described below is executed. The radio communication unit 32 performs radio communication with the portable unit and the like 34. The radio communication unit 32 has, for example, a modulation circuit for modulating a transmission signal, an antenna for transmitting the modulated signal in a wireless manner, and a demodulation circuit for demodulating the received signal. In addition, the keyless controller 31 transmits or receives the signal based on a radio communication scheme to or from the portable unit and the like 34 using the radio communication unit 32. Furthermore, the keyless controller 31 is connected to the ECM 21 so as to transmit or receive signals through an authentication signal line 305. Moreover, the keyless controller power input unit 313 of the keyless controller 31 (for example, a terminal for receiving supplied power) is connected to a battery power line 301 connected to the battery 24 through a keyless controller power line 312.

The ECM power relay switch 33 is a relay switch capable of switching the power of the ECM 21 between ON and OFF. The ECM power relay switch 33 is provided in a path for supplying power output from the battery 24 to the ECM 21 and is switched between a state in which the battery 24 and the ECM 21 are electrically connected and a state in which they are not electrically connected. In the example of FIG. 3, the ECM power relay switch 33 is provided between the battery power line 301 connected to the battery 24 and an ECM power line 304 connected to a power receiving portion 212 of the ECM 21 (for example, a terminal for receiving power). The ECM power relay switch 33 is switched between ON (closed state) and OFF (opened state) using the keyless controller 31. When the ECM power relay switch 33 is in ON, the power output from the battery 24 is supplied to the ECM 21 through the battery power line 301, the ECM power relay switch 33, and the ECM power line 304. The ECM 21 is activated when the power from the battery 24 starts to be supplied. If the control of the engine 25 is permitted by the ECM 21, a process of controlling the outboard motor 2 is executed while the power is supplied.

The S/S switch 401 of the switch device 4 is a switch for switching between start and stop of the engine 25 of the outboard motor 2. The S/S switch 401 is provided in the middle of a path used to connect the battery 24 and an S/S signal receiver 211 of the ECM 21 (for example, a terminal for receiving signals). In the example of FIG. 3, the S/S switch 401 is provided between the battery power line 301 connected to the battery 24 and the S/S signal line 303 connected to the S/S signal receiver 211 of the ECM 21. In addition, when the S/S switch 401 is in ON (closed state), the output voltage of the battery 24 is applied to the S/S signal receiver 211 of the ECM 21 through the battery power line 301, the S/S switch 401, and the S/S signal line 303. Meanwhile, when the S/S switch 401 is in OFF (opened state), the output voltage of the battery 24 is not applied to the S/S signal receiver 211 of the ECM 21. In addition, the ECM 21 can detect whether the S/S switch 401 is in OFF or ON by detecting an electric potential (or a change of the potential) of the S/S signal receiver 211.

Note that the remote handset system 3 may have a S/S switch detection unit configured to detect whether the S/S switch 401 is switched from OFF to ON separately from the ECM 21. In this case, the S/S switch detection unit generates the S/S signal and transmits it to the S/S signal receiver 211 of the ECM 21 when it is detected that the S/S switch 401 is switched from OFF to ON. Note that the S/S signal is a signal representing that the S/S switch 401 is switched from OFF to ON.

The ENT switch 402 of the switch device 4 is a switch for transmitting, to the keyless controller 31, a signal for returning (activating) the keyless controller 31 from a sleep state to a state in which the authentication process can be executed. In the keyless controller 31, the keyless controller power input unit 313 is supplied with the power from the battery 24 through the battery power line 301 and the keyless controller power line 312 at all times. In addition, although the keyless controller 31 can detect whether the ENT switch 402 is switched from OFF to ON at all times, the keyless controller 31 has a (sleep) state in which the authentication process cannot be executed. Furthermore, the keyless controller 31 is returned (activated) to a state in which the authentication process can be executed when it is detected that the ENT switch 402 is switched from OFF to ON under the sleep state.

The EMA switch 403 of the switch device 4 is a switch for setting the power of the ECM 21 to ON by supplying power to the ECM 21 even when a user does not possess the portable unit and the like 34, when the portable unit and the like 34 is not operated, or when the portable unit and the like 34 cannot be used. The EMA switch 403 is provided in the middle of a path for connecting the battery 24 and the power receiving portion 212 of the ECM 21. In the example of FIG. 3, the EMA switch 403 is provided between the battery power line 301 connected to the battery 24 and the ECM power line 304 connected to the power receiving portion 212 of the ECM 21. When the EMA switch 403 is in ON (circuit close state), the power output from the battery 24 is supplied to the ECM 21 through the battery power line 301, the EMA switch 403, and the ECM power line 304. Note that the EMA switch 403 is a switch activated by the use of a mechanical key 501 suitable for the pin cylinder lock described below in switching between OFF (opened state) and ON (closed state).

In addition, the outboard motor 2 has a starter relay switch 23 and a starter motor 22 in order to start the engine 25. The starter relay switch 23 is a relay switch switched between OFF (opened state) and ON (closed state) by the ECM 21. The starter relay switch 23 is provided between the battery power line 301 and the starter motor 22. When the starter relay switch 23 is in ON, the power output from the battery 24 is supplied to the starter motor 22 through the battery power line 301 and the starter relay switch 23. The starter motor 22 is operated when the power is supplied from the battery 24 in order to start the engine 25 by rotating a crankshaft of the engine 25.

In this manner, the control system of the outboard motor 2 is provided with a path passing through the ECM power relay switch 33 as a path for supplying power for operating the ECM 21 from the battery 24 and a path passing through the EMA switch 403 of the switch device 4 arranged in parallel to each other. In this configuration, if the EMA switch 403 can be set to ON even when it is difficult to set the ECM power relay switch 33 to ON, it is possible to set the power of the ECM 21 to ON and activate the ECM 21.

<Operation of Remote Handset System>

Here, the authentication process of the remote handset system 3 and the processing and operation of the ECM 21 for starting the engine 25 will be described. The keyless controller 31 is returned (activated) from the sleep state to a state in which the authentication process can be executed if it is detected that the ENT switch 402 is switched from OFF to ON. In addition, as the keyless controller 31 is activated, the keyless controller 31 executes the authentication process with the portable unit and the like 34 through the radio communication unit 32. Details of the authentication process are as follows. First, the keyless controller 31 transmits a request signal through the radio communication unit 32 in a wireless manner. The portable unit and the like 34 staying within a reachable range of the request signal transmits an answer signal including ID information of itself in a wireless manner as it receives the request signal. The keyless controller 31 receives the answer signal through the radio communication unit 32 and checks whether or not the ID has been registered. In addition, if it is determined that the portable unit and the like 34 exists with a predetermined distance from the radio communication unit 32 on the basis of the strength of the electric wave of the received answer signal, the ECM power relay switch 33 is switched to ON to supply power from the battery 24 to the ECM 21 and activate the ECM 21. As the ECM 21 is activated, the ID information of the ECM 21 is read through the authentication signal line 305, and it is determined whether the ID information registered in the keyless controller 31 matches the ID information stored in the ECM 21. Furthermore, if it is determined that the ID information registered in the keyless controller 31 matches the ID information of the ECM 21, the keyless controller 31 permits the ECM 21 to control the engine 25. As a result, the ECM 21 has an engine controllable state in which the engine 25 of the outboard motor 2 can be controlled.

If it is detected that the S/S switch 401 is switched from OFF to ON under the engine controllable state, the ECM 21 switches the starter relay switch 23 from OFF to ON when the engine 25 of the outboard motor 2 stops. When the starter relay switch 23 is switched to ON, the power output from the battery 24 is supplied to the starter motor 22 through the battery power line 301 and the starter relay switch 23. As a result, the starter motor 22 is operated to start the engine 25 by rotating the crankshaft of the outboard motor 2.

If the EMA switch 403 is switched from OFF to ON while power is not supplied to the ECM 21 from the battery 24, the power of the battery 24 is supplied to the ECM 21 through the battery power line 301, the EMA switch 403, and the ECM power line 304. As a result, the ECM 21 is activated. In this state, if a predetermined manipulation is performed for the ECM 21 (that is, the ECM 21 detects a predetermined manipulation), the ECM 21 becomes in an engine controllable state in which the engine 25 can be controlled. Therefore, a user is allowed to start the engine 25 of the outboard motor 2 by switching the EMA switch 403 from OFF to ON and then manipulating the S/S switch 401. In some cases, it is necessary to operate the engine 25 of the outboard motor 2, for example, even when a user does not possess the portable unit and the like 34 or when the portable unit and the like 34 is not operated. Specifically, this necessity happens when a user lost the portable unit and the like 34 in offshore, or a battery of the portable unit and the like 34 is fully discharged or failed. In this case, a user can start the engine 25 of the outboard motor 2 by switching the EMA switch 403 from OFF to ON.

Note that the ECM 21 stops the engine 25 if it is detected that the S/S switch 401 is switched from OFF to ON while the engine 25 is operated. In addition, if it is detected that the ENT switch 402 is switched from OFF to ON while the ECM power relay switch 33 is in ON, the keyless controller 31 switches the ECM power relay switch 33 from ON to OFF to stop the operation of the ECM 21.

Note that, although described below, both the ENT switch 402 and the S/S switch 401 are switches switchable between ON and OFF without a mechanical key 501. For this reason, a user can start the engine 25 of the outboard motor 2 without a mechanical key 501 if a user possesses the portable unit and the like 34. Meanwhile, the EMA switch 403 is a switch switchable between ON and OFF by the use of a suitable mechanical key 501. Therefore, a user can start the engine 25 of the outboard motor 2 if the user possesses a suitable mechanical key 501 even when a user does not possess the portable unit and the like 34.

<Configuration of Switch Device>

Figure 4:
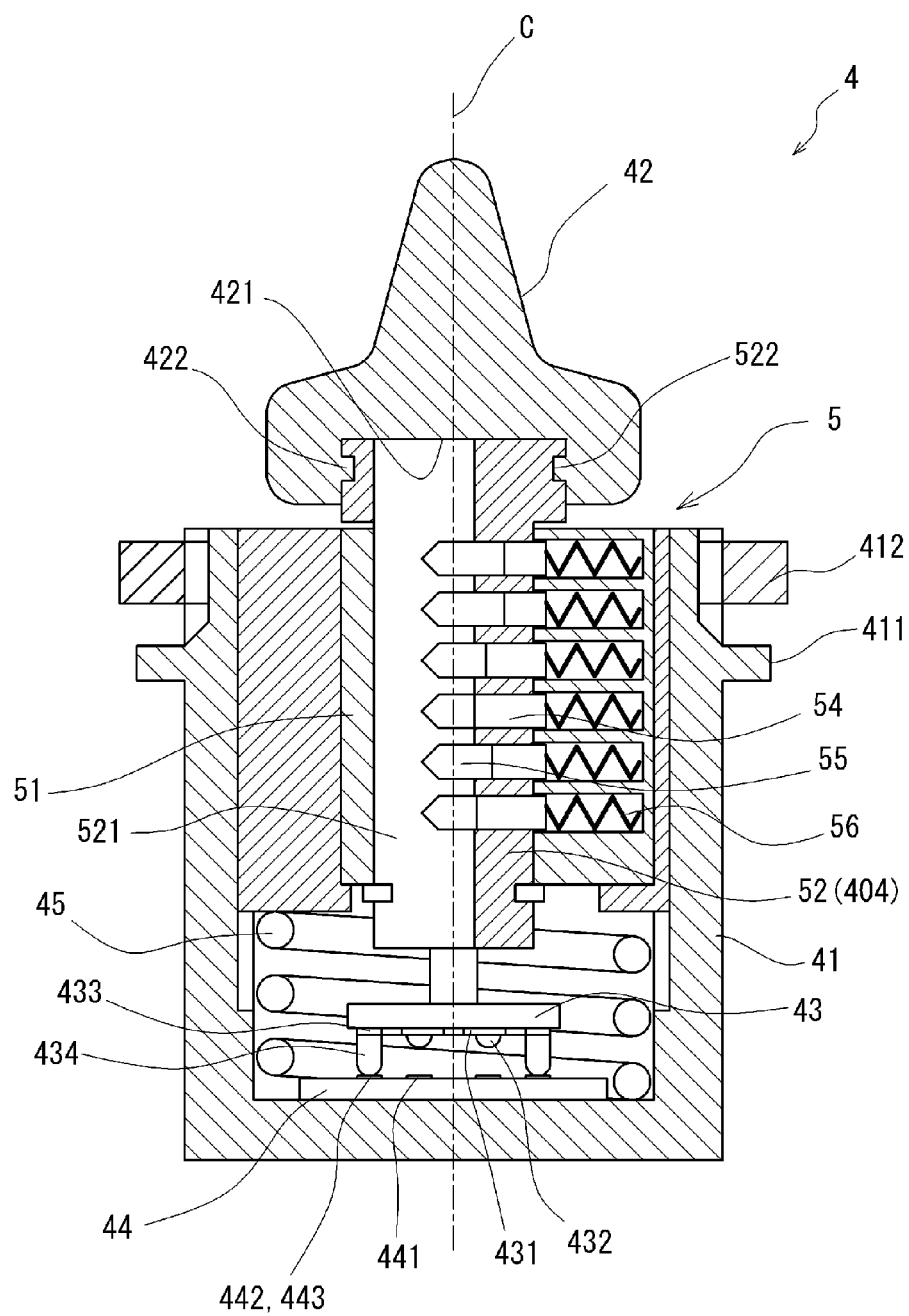
FIG. 4 is a cross-sectional view schematically illustrating an exemplary configuration of a switch device.

Next, an exemplary configuration of the switch device 4 will be described. FIG. 4 is a cross-sectional view schematically illustrating an exemplary configuration of the switch device 4. In the switch device 4, the S/S switch 401, the ENT switch 402, and the EMA switch 403 are embedded integrally. The switch device 4 has a switch casing 41, a pin cylinder lock 5, a control knob 42, a movable terminal plate 43, a fixed terminal plate 44, and a coil spring 45 as an exemplary biasing member. In addition, as illustrated in FIG. 4, the switch device 4 has a generally bar-like shape. The control knob 42 is placed outside the remote controller housing 131 while the switch device 4 is assembled with the remote controller housing 131. The side opposite to the control knob 42 is placed inside the remote controller housing 131. For simplicity purposes, the side of the switch device 4 in which the control knob 42 is provided will be referred to as an "OUT side," and the opposite side thereto will be referred to as an "IN side."

The switch casing 41 has, for example, a hollowed cylindrical shape. The outer circumferential surface of the switch casing 41 close to the OUT side is provided with a flange 411 protruding radially outward. In addition, a male thread portion for screwing an installation nut 412 is provided on the outer circumferential surface closer to the OUT side than the flange 411. The switch casing 41 is fixed to the remote controller housing 131 by nipping the remote controller housing 131 with the installation nut 412 installed to the male thread portion and the flange 411.

The pin cylinder lock 5 has an outer cylinder 51 and an inner cylinder 52. The outer cylinder 51 is a cylindrical member housed in the switch casing 41 such that its axial line is directed in parallel to the longitudinal direction of the switch casing 41. The outer cylinder 51 is reciprocatable in the axial line direction with respect to the switch casing 41 (that is, capable of making a rectilinear motion to the IN and OUT sides), but is not rotatable around the axial line. For example, the outer cylinder 51 and the switch casing 41 are splined to each other directly or by interposing another member such as an adapter. The inner cylinder 52 is an exemplary common manipulating member 404 for performing a manipulation for switching the S/S switch 401, the ENT switch 402, and the EMA switch 403 between OFF (opened state) and ON (closed state). The inner cylinder 52 is a columnar member housed in the outer cylinder 51 coaxially with each other. The inner cylinder 52 is rotatable around the axial line (the rotation center line C) with respect to the outer cylinder 51, but is not reciprocatable (rectilinear motion) in the axial line direction with respect to the outer cylinder 51. In addition, the inner cylinder 52 is provided with a keyhole 521 where the mechanical key 501 can be inserted. Similar to a typical pin cylinder lock, an opening of the keyhole 521 is provided on an OUT-side end face of the axial line direction of the inner cylinder 52, and the mechanical key 501 can be inserted into or removed from the keyhole 521 through the opening of the end face. Note that the inner cylinder 52 is rotatable with respect to the outer cylinder 51, but is not reciprocatable (rectilinear motion) as described above. For this reason, the inner cylinder 52 can be rotated around the axial line with respect to the outer cylinder 51 And the switch casing 41 while the pin cylinder lock 5 is housed in the switch casing 41. In addition, the outer cylinder 51 and the inner cylinder 52 are integrated into the switch casing 41 so that they can reciprocate (rectilinear motion) in the axial line direction.

<Configuration of Pin Cylinder Lock>

Here, an exemplary configuration of the pin cylinder lock 5 of the switch device 4 will be described. In the pin cylinder lock 5 of the switch device 4, the mechanical key 501 becomes insertable to or removable from the keyhole 521 provided in the inner cylinder 52 when the inner cylinder 52 is placed in a predetermined rotational direction (angle) with respect to the outer cylinder 51. In addition, the inner cylinder 52 can rotate by a predetermined angle either clockwise Or counterclockwise with respect to the outer cylinder 51 from the insertable/removable position of the mechanical key 501. For simplicity purposes, for a rotational position of the inner cylinder 52 with respect to the outer cylinder 51, the insertable/removable position of the mechanical key 501 will be referred to as a "normal position." In addition, a position rotated by a predetermined angle in one predetermined direction from the "normal position" will be referred to as an "entry position," and a position rotated by a predetermined angle in a direction opposite to the one predetermined direction from the "normal position" will be referred to as an "emergency position." In addition, the pin cylinder lock 5 of the switch device 4 is configured to rotate the inner cylinder 52 to the entry position from the normal position even when the suitable mechanical key 501 is not inserted into the keyhole 521. Furthermore, the pin cylinder lock 5 is configured to rotate the inner cylinder 52 from the normal position to the emergency position when the suitable mechanical key 501 is inserted into the keyhole 521.

Figure 5A:
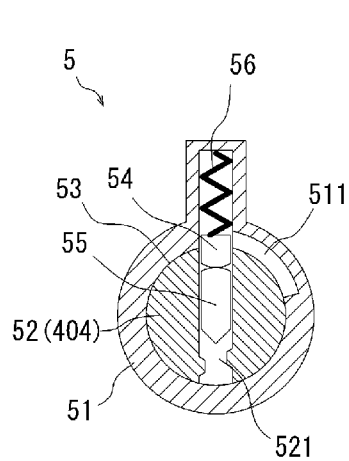
FIG. 5A is a diagram schematically illustrating an exemplary configuration of a pin cylinder lock as a cross-sectional view of the pin cylinder lock taken on a plane perpendicular to an axial line direction.
Figure 5B:
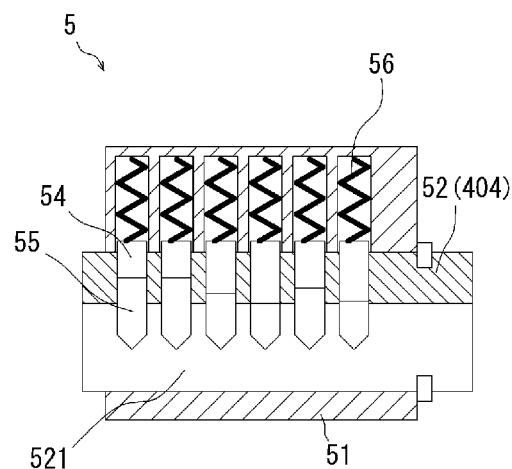
FIG. 5B is a diagram schematically illustrating an exemplary configuration of the pin cylinder lock as a cross-sectional view taken on a plane in parallel to the axial line direction.
Figure 5C:
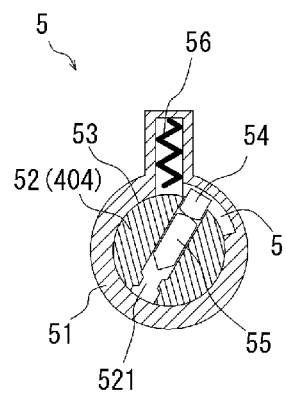
FIG. 5C is a diagram schematically illustrating an exemplary configuration of the pin cylinder lock as a cross-sectional view illustrating a state that an inner cylinder is placed in an entry position.
Figure 5D:
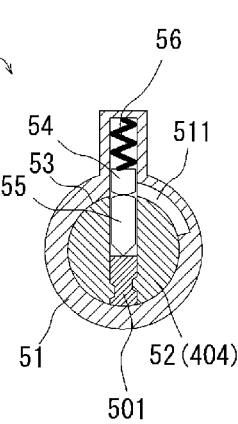
FIG. 5D is a diagram schematically illustrating an exemplary configuration of the pin cylinder lock as a cross-sectional view illustrating a state that a proper mechanical key is inserted into a keyhole of the inner cylinder, and the inner cylinder is placed in a normal position.
Figure 5E:
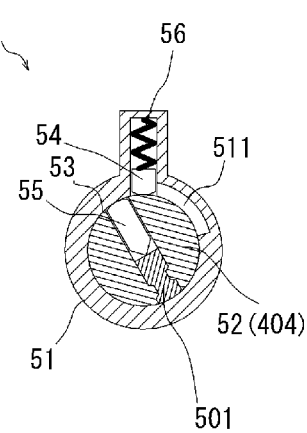
FIG. 5E is a diagram schematically illustrating an exemplary configuration of the pin cylinder lock as a cross-sectional view illustrating a state that the inner cylinder is placed in an emergency position.

FIGS. 5A to 5E are diagrams schematically illustrating an exemplary configuration of the pin cylinder lock 5. Specifically, FIG. 5A is a cross-sectional view taken on a plane perpendicular to the axial line direction of the pin cylinder lock 5. FIG. 5B is a cross-sectional view taken on a plane parallel to the axial line direction of the pin cylinder lock 5. FIG. 5C is a cross-sectional view illustrating a state that the inner cylinder 52 is placed in the entry position. FIG. 5D is a cross-sectional view illustrating a state that the suitable mechanical key 501 is inserted into the keyhole 521 of the inner cylinder 52, and the inner cylinder 52 is placed in the normal position. FIG. 5E is a cross-sectional view illustrating a state that the inner cylinder 52 is placed in the emergency position. Note that FIGS. 5A, 5C, 5D, and 5E are diagrams seen from the OUT side, that is, from the side where a user inserts or removes the mechanical key 501.

The pin cylinder lock 5 has the inner cylinder 52 provided with the keyhole 521, the outer cylinder 51 in which the inner cylinder 52 is rotatably housed, a plurality of driver pins 54 and tumbler pins 55, and a biasing member 56 configured to bias the plurality of driver pins 54 and tumbler pins 55 toward the rotation center line C of the inner cylinder 52. The plurality of driver pins 54 and tumbler pins 55 are arranged side by side along the axial lines of the outer and inner cylinders 51 and 52. In addition, if the opening of the keyhole 521 provided on the side face of the inner cylinder 52 matches a circumferential position of the plurality of driver pins 54 and tumbler pins 55, the plurality of driver pins 54 and tumbler pins 55 are inserted into the inside of the keyhole 521 provided in the inner cylinder 52 by virtue of the biasing force of the biasing member 56 (for example, various springs known in the art). According to this embodiment, this position of the inner cylinder 52 corresponds to the "normal position."

As illustrated in FIG. 5A, a large diameter portion 511 having an inner diameter larger than those of other portions is provided on the inner circumferential surface of the outer cylinder 51 toward one predetermined direction from a position where the driver pins 54 and the tumbler pins 55 are provided (in FIG. 5A, clockwise). As illustrated in FIG. 5A, the inner circumferential surface of the large diameter portion 511 is positioned radially outward from the radial outer ends of all of the driver pins 54 when the suitable mechanical key 501 is not inserted into the keyhole 521. In this configuration, the driver pins 54 do not interfere with the outer cylinder 51 within a range where the large diameter portion 511 is provided. For this reason, as illustrated in FIG.

5C, the inner cylinder 52 can be rotated to one predetermined direction with respect to the outer cylinder 51 from the normal position along with the tumbler pins 55 and the driver pins 54. A position where the inner cylinder 52 is rotated by a predetermined angle in the one predetermined direction with respect to the outer cylinder 51 is the "entry position." Note that a specific rotation angle from the normal position to the entry position may be set to, for example, 30°, but not particularly limited thereto.

Meanwhile, on the inner circumferential surface of the outer cylinder 51, the large diameter portion 511 is not provided in a direction (in FIG. 5A, counterclockwise) opposite to the one predetermined direction from the position where the driver pins 54 and the tumbler pins 55 are provided. For this reason, if the suitable mechanical key 501 is not inserted into the keyhole 521, the driver pins 54 interfere with the outer cylinder 51. Therefore, the inner cylinder 52 is inhibited to rotate oppositely to the one predetermined direction from the normal position. In addition, as illustrated in FIG. 5D, if the suitable mechanical key 501 is inserted into the keyhole 521, a boundary between the driver pins 54 and the tumbler pins 55 matches a shear line 53. In other words, a key capable of matching the boundary between overall driver pins 54 and tumbler pins 55 with the shear line 53 is the "suitable mechanical key 501." It the suitable mechanical key 501 is inserted into the keyhole 521, the inner cylinder 52 is allowed to rotate oppositely to the one predetermined direction from the normal position as illustrated in FIG. 5E. A position where the inner cylinder 52 is rotated by a predetermined angle oppositely to the one predetermined direction with respect to the outer cylinder 51 is the "emergency position." Note that a specific rotation angle from the normal position to the emergency position may be set to, for example, 30°, but not particularly limited thereto.

As described above, when the suitable mechanical key 501 is not inserted into the keyhole 521, the inner cylinder 52 of the pin cylinder lock 5 according to this embodiment can be rotated in one predetermined direction from the normal position (a position where the mechanical key 501 can be inserted or removed), but cannot be rotated oppositely. In addition, if the suitable mechanical key 501 is inserted into the keyhole 521, the inner cylinder 52 can be rotated oppositely to the one predetermined direction. Therefore, a user is allowed to rotate the inner cylinder 52 from the normal position to the entry position without the suitable mechanical key 501. However, if the suitable mechanical key 501 is not provided, a user is not allowed to rotate the inner cylinder 52 from the normal position to the emergency position.

Figure 6A:
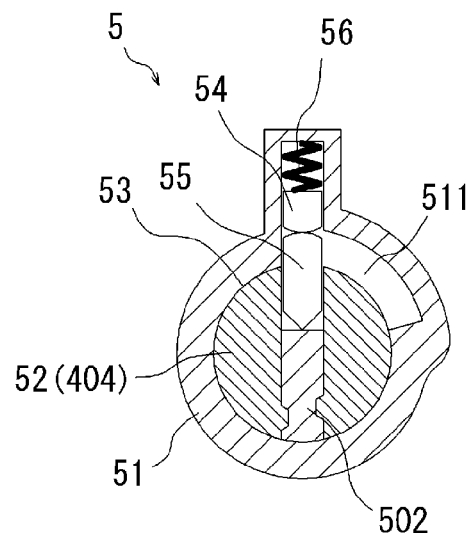
FIG. 6A is a cross-sectional view schematically illustrating another exemplary configuration of the pin cylinder lock as a diagram illustrating a state that the inner cylinder is placed in the normal position.
Figure 6B:
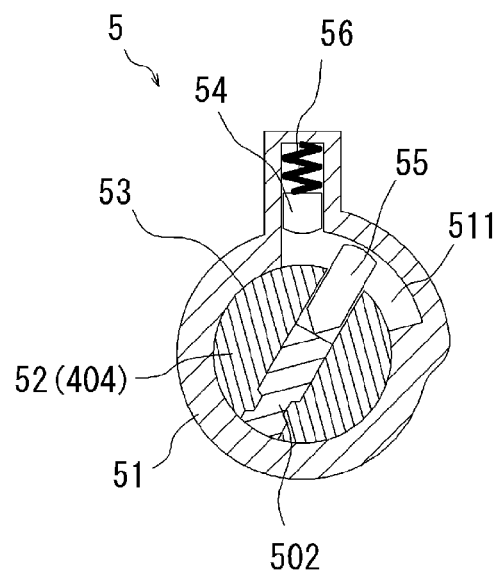
FIG. 6B is a cross-sectional view schematically illustrating another exemplary configuration of the pin cylinder lock as a diagram illustrating a state that the inner cylinder is placed in the entry position.

Note that the pin cylinder lock 5 may have a configuration described below. FIGS. 6A and 6B are cross-sectional views schematically illustrating another exemplary configuration of the pin cylinder lock 5. Specifically, FIG. 6A illustrates a state that the inner cylinder 52 is placed in the normal position, and FIG. 6B illustrates a state that the inner cylinder 52 is placed in the entry position. In this example, an "even mechanical key 502" is employed to rotate the inner cylinder 52 from the normal position to the entry position. Here, the "even mechanical key 502" refers to a key shaped to maximize projecting levels of all of the tumbler pins 55 out of the keys insertable into the keyhole 521. For example, a "blank key" not subjected to cutting of unevenness may be employed as the "even mechanical key 502."

Similarly, in this example, the large diameter portion 511 is provided on the inner circumferential surface of the outer cylinder 51 as illustrated in FIGS. 6A and 6B. If the even mechanical key 502 is inserted into the keyhole 521, all of the driver pins 54 and the tumbler pins 55 are moved radially outward. In this state, the inner circumferential surface of the large diameter portion 511 is positioned radially outward from the radial outer ends of all of the tumbler pins 55. However, one or more tumbler pins 55 straddles the inner cylinder 52 and a portion of the outer cylinder 51 excluding the large diameter portion 511. In this configuration, if the even mechanical key 502 is not inserted into the keyhole 521, the inner cylinder 52 is not allowed to rotate from the normal position to either the entry position or the emergency position. In addition, if the even mechanical key 502 is inserted into the keyhole 521, the inner cylinder 52 is allowed to rotate from the normal position to the entry position. However, the inner cylinder 52 is not allowed to rotate from the normal position to the emergency position. Meanwhile, if the suitable mechanical key 501 is inserted into the keyhole 521, the inner cylinder 52 is allowed to rotate from the normal position to the emergency position.

The pin cylinder lock 5 further includes a recovery mechanism (not shown) configured to automatically recover the inner cylinder 52 from the entry position to the normal position. In addition, when the inner cylinder 52 is not manipulated to rotate to the entry position, the inner cylinder 52 is maintained in the normal position by virtue of the recovery mechanism. In addition, if a user stops the manipulation (for example, if a user releases the control knob 42) even when a user manipulates the inner cylinder 52 to rotate to the entry position, the inner cylinder 52 automatically moves to the normal position by virtue of the recovery mechanism. A configuration of the recovery mechanism is not particularly limited. For example, an ignition switch provided with a typical pin cylinder lock known in the art has a "START position" for starting the engine and an "ON position" for supplying power to each part and is provided with a recovery mechanism for automatically recovering the inner cylinder from the "START position" to the "ON position." The recovery mechanism for recovering the inner cylinder from the "START" position to the "ON" position in the typical ignition switch of the prior art may be employed as the recovery mechanism for recovering the inner cylinder from the "entry position" to the "normal position" in the pin cylinder lock 5 according to this embodiment.

<Configuration of Control Knob>

The control knob 42 will be described with reference to FIG. 3. The control knob 42 is a member treated by a user to manipulate the switch device 4. The control knob 42 is detachably installed in the inner cylinder 52 of the pin cylinder lock 5 and is rotated in synchronization with the inner cylinder 52 of the pin cylinder lock 5 so as to axially move in synchronization with the inner cylinder 52 and the outer cylinder 51 of the pin cylinder lock 5. For example, the OUT-side end of the inner cylinder 52 of the pin cylinder lock 5 protrudes from the outer cylinder 51, and a trench-like locking concave portion 522 recessed to the radial center side is provided on the side face of this protrusion. Meanwhile, a fitting concave portion 421 to which the OUT-side end of the inner cylinder 52 of the pin cylinder lock 5 can be fitted is provided on the IN-side face of the control knob 42. In addition, a locking convex portion 422 protruding toward the radial center side of the fitted inner cylinder 52 is provided on the inner circumferential surface of the fitting concave portion 421. Furthermore, when the locking convex portion 422 of the control knob 42 is locked (fitted) to the locking concave portion 522 of the inner cylinder 52, the control knob 42 and the inner cylinder 52 of the pin cylinder lock 5 are not allowed to displace relatively in both the rotational direction and the axial line direction. For this reason, the control knob 42 and the inner cylinder 52 of the pin cylinder lock 5 are rotated around the axial line in synchronization with respect to the outer cylinder 51 and the switch casing 41. Moreover, the control knob 42 and the inner and outer cylinders 52 and 51 of the pin cylinder lock 5 are moved axially in synchronization with respect to the switch casing 41.

A specific shape of the control knob 42 is not particularly limited. The control knob 42 may have any shape as long as a user can grip and rotate it with fingers. For example, the control knob 42 may have a shape similar to that of a gas cooker knob in home.

Alternatively, the trench-shaped locking concave portion 522 may be provided in the fitting concave portion 421 of the control knob 42, and the protruding locking convex portion 422 that can be locked to the locking concave portion 522 may be provided on the side face of the inner cylinder 52. That is, the trench-shaped locking concave portion 522 may be provided in any one of the control knob 42 and the inner cylinder 52, and the protruding locking convex portion 422 may be provided in the other one of the control knob 42 and the inner cylinder 52. The important thing is that a relative displacement between the control knob 42 and the inner cylinder 52 can be prevented by locking the protrusion-shaped locking convex portion 422 to the trench-shaped locking concave portion 522. In addition, in this configuration, it is possible to prevent the control knob 42 from being removed from the inner cylinder 52. In this manner, the trench-shaped locking concave portion 522 and the protruding locking convex portion 422 that can be locked to the locking concave portion 522 constitute a removal prevention mechanism for preventing the control knob 42 from being removed from the inner cylinder 52.

The control knob 42 is formed of a synthetic resin material and the like. For this reason, a user is allowed to remove the control knob 42 from the inner cylinder 52 by elastically deforming the control knob 42.

In this configuration, a user is allowed to perform a manipulation for rotating the inner cylinder 52 as an exemplary common manipulating member 404 from the normal position to the entry position and a manipulation for rotating the inner cylinder 52 from the normal position to the emergency position by handling the control knob 42. In addition, a user is allowed to move the inner cylinder 52 as an exemplary common single manipulating member 404 in the axial line direction with respect to the switch casing 41 along with the outer cylinder 51 by making a rectilinear motion by pressing the control knob 42 to the IN side.

As described above, the fitting concave portion 421 is provided on the IN-side end face of the control knob 42, and the OUT-side end of the inner cylinder 52 of the pin cylinder lock 5 is fitted to the fitting concave portion 421. The opening of the keyhole 521 where the mechanical key 501 can be inserted or removed is provided on the OUT-side end face of the inner cylinder 52. However, if the control knob 42 is installed in the pin cylinder lock 5 of the switch device 4, the opening of the keyhole 521 is concealed by the control knob 42 and is covered not to be accessed.

<Configurations of Movable Terminal Plate and Fixed Terminal Plate>

The movable terminal plate 43 and the fixed terminal plate 44 are provided in the IN side of the inner cylinder 52 of the pin cylinder lock 5. In addition, the movable terminal plate 43 and the fixed terminal plate 44 face each other. The movable terminal plate 43 is rotated in synchronization with the inner cylinder 52 as an exemplary common manipulating member 404. For example, the movable terminal plate 43 is combined with the inner cylinder 52 of the pin cylinder lock 5 directly or by interposing another member. Note that the inner and outer cylinders 52 and 51 of the pin cylinder lock 5 can reciprocate in the axial line direction with respect to the switch casing 41 as described above. For this reason, the movable terminal plate 43 is operated in synchronization with the inner cylinder 52 and reciprocates in the axial line direction with respect to the switch casing 41. The fixed terminal plate 44 is provided not to rotate around the axial line with respect to the switch casing 41 and not to move relatively in the axial line direction. For example, the fixed terminal plate 44 is fixed to the switch casing 41 directly or by interposing another member. In this configuration, as the inner and outer cylinders 52 and 51 of the pin cylinder lock 5 are moved in the axial line direction with respect to the switch casing 41, a distance between the movable terminal plate 43 and the fixed terminal plate 44 is changed. In addition, as the inner cylinder 52 is rotated around the axial line with respect to the outer cylinder 51 and the switch casing 41, the movable terminal plate 43 is rotated around the axial line relatively with respect to the fixed terminal plate 44.

The movable terminal plate 43 is biased by the biasing member toward the OUT side in the axial line direction. For this reason, when any external force other than the biasing force of the biasing member is not applied, the movable terminal plate 43 is held in a position of the OUT-side end within a movable range of reciprocation by virtue of the biasing force of the biasing member. That is, the movable terminal plate 43 is held in the farthest position from the fixed terminal plate 44 within a movable range of reciprocation thereof. For example, a coil spring 45 as the biasing member is housed in the switch casing 41, and the movable terminal plate 43 is biased toward the OUT side of the axial line direction by the coil spring 45. In addition, when the inner cylinder 52 is pressed to the IN side by the control knob 42 to make a rectilinear motion, the movable terminal plate 43 and the fixed terminal plate 44 approach each other. As the biasing member, any one of various springs or elastic bodies such as rubber known in the art may be employed, other than the coil spring 45.

A plurality of terminals is provided on a surface of the movable terminal plate 43 facing the fixed terminal plate 44. Similarly, a plurality of terminals is provided on a surface of the fixed terminal plate 44 facing the movable terminal plate 43. These terminals are used as the S/S switch 401, the ENT switch 402, and the EMA switch 403. In addition, a contact state (that is, connection state) between the terminal of the movable terminal plate 43 and the terminal of the fixed terminal plate 44 is switched depending on an axial distance or a relative rotational angle between the movable terminal plate 43 and the fixed terminal plate 44. As a result, each of the S/S switch 401, the ENT switch 402, and the EMA switch 403 is switched between ON (closed state) and OFF (opened state).

<Configuration of Terminals>

Figure 7A:
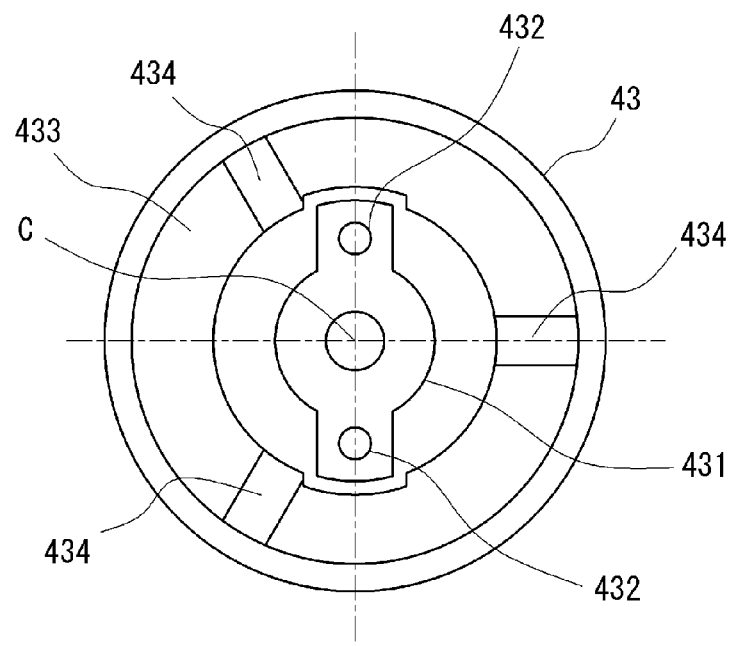
FIG. 7A is a top plan view schematically illustrating an exemplary configuration of terminals provided in a movable terminal plate.
Figure 7B:
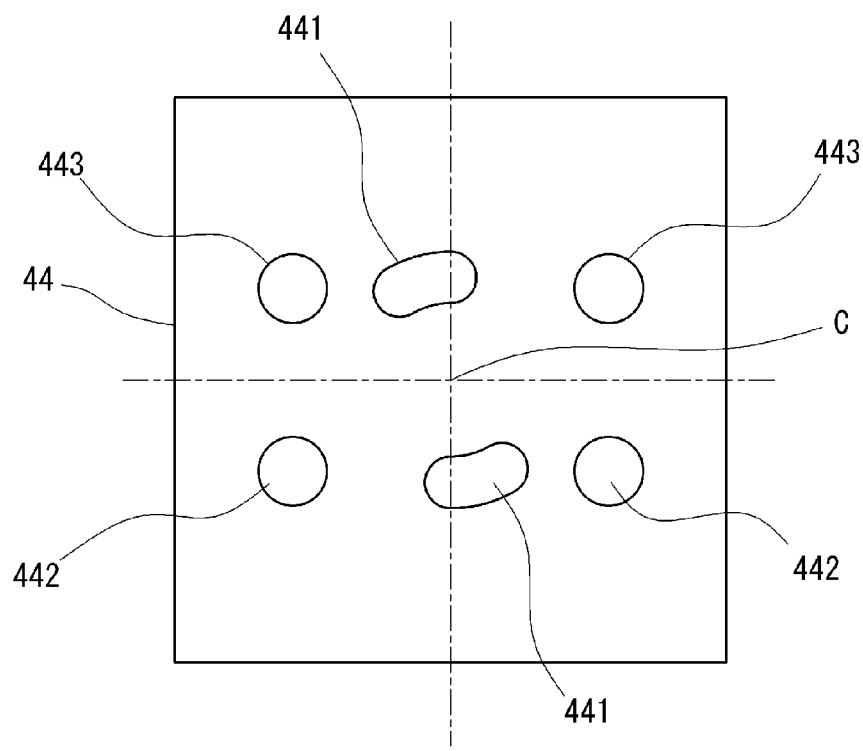
FIG. 7B is a top plan view schematically illustrating an exemplary configuration of terminals provided in a fixed terminal plate.

Here, exemplary configurations of the terminals provided in the movable terminal plate 43 and the fixed terminal plate 44 will be described with reference to FIGS. 7A and 7B. FIG. 7A is a top plan view schematically illustrating an exemplary configuration of the terminal provided in the movable terminal plate 43. FIG. 7B is a top plan view schematically illustrating an exemplary configuration of the terminal provided in the fixed terminal plate 44. Note that both FIGS. 7A and 7B are diagrams illustrating the axial line direction (that is, the extending direction of the rotation center line C of the inner cylinder 52) seen from the OUT side (in the same side as those of FIGS. 5A, 5C, 5D, and 5E). For this reason, FIG. 7A is a perspective view.

As illustrated in FIG. 7A, a pair of movable terminals including first and second movable terminals 431 and 433 is provided on a surface of the movable terminal plate 43 facing the fixed terminal plate 44. Meanwhile, as illustrated in FIG. 7B, a pair of S/S terminals 441, a pair of ENT terminals 442, and a pair of EMA terminals 443 are provided on a surface of the fixed terminal plate 44 facing the movable terminal plate 43. In addition, the first movable terminal 431 and a pair of S/S terminals 441 serve as a S/S switch 401. The second movable terminal 433 and a pair of ENT terminals 442 serve as the ENT switch 402. The second movable terminal 433 and a pair of EMA terminals 443 serve as the EMA switch 403.

As illustrated in FIG. 7A, the first movable terminal 431 is provided with a pair of first contact portions 432 protruding toward the fixed terminal plate 44. The pair of first contact portions 432 is integrated with the first movable terminal 431, and they are electrically connected to each other. Such a pair of first contact portions 432 are arranged in point symmetry with respect to the rotation center line C of the inner cylinder 52 (that is, a center line of the relative rotation between the movable terminal plate 43 and the fixed terminal plate 44) as seen in the axial line direction (as seen from the rotation center line C of the inner cylinder 52).

The second movable terminal 433 has a ring shape concentric to the rotation center line C of the inner cylinder 52 and is provided to surround the first movable terminal 431. The second movable terminal 433 is provided with three second contact portions 434 protruding toward the fixed terminal plate 44. The three second contact portions 434 are electrically connected to each other. In addition, the three second contact portions 434 are arranged with the same distance from the rotation center of the inner cylinder 52 and at even intervals in a circumferential direction. Note that the first and second movable terminals 431 and 433 are not electrically connected to each other.

Protruding levels of the three second contact portions 434 are set to be higher than the protruding levels of the pair of first contact portions 432. In addition, the protruding levels of the three second contact portions 434 are elastically reduced. For example, the three second contact portions 434 are displaceable relatively in the axial line direction with respect to the movable terminal plate 43 and are biased toward the fixed terminal plate 44 by a biasing member such as a spring. Alternatively, the three second contact portions 434 may be elastically deformable such that the protruding levels are reduced when a pressing force is applied in the axial line direction.

As described above, if the movable terminal plate 43 is moved in the axial line direction in synchronization with the inner cylinder 52, an axial distance between the movable terminal plate 43 and the fixed terminal plate 44 is changed. In particular, the distance between the movable terminal plate 43 and the fixed terminal plate 44 is maximized when the inner cylinder 52 is placed in the OUT-side end within a movable range of the axial line direction. In contrast, the distance between the movable terminal plate 43 and the fixed terminal plate 44 is minimized when the inner cylinder 52 is placed in the IN-side end. In addition, the dimensions of the protruding levels of the three second contact portions 434 are set such that the second contact portions 434 can make contact with the terminal of the fixed terminal plate 44 (the ENT switch 402 and the EMA switch 403) even when the movable terminal plate 43 and the fixed terminal plate 44 are separated farthest in the axial line direction. That is, the dimensions of the three second contact portions 434 of the movable terminal plate 43 are set such that they can make contact with the terminal of the fixed terminal plate 44 (the ENT switch 402 and the EMA switch 403) regardless of the distance between the movable terminal plate 43 and the fixed terminal plate 44.

In contrast, protrusion dimensions of the pair of first contact portions 432 of the movable terminal plate 43 are set such that the first contact portions 432 do not make contact with the terminal of the fixed terminal plate 44 (S/S terminal 441) when the inner cylinder 52 is positioned in the OUT-side end within the movable range of the axial line direction, and it can make contact when the inner cylinder 52 is positioned in the IN side end.

As illustrated in FIG. 7B, the pair of S/S terminals 441 are arranged in point symmetry with respect to the rotation center line C of the inner cylinder 52. In addition, a distance of the pair of S/S terminals 441 from the rotation center line C of the inner cylinder 52 is set to be equal to a distance of the pair of first contact portions 432 of the first movable terminal 431 from the rotation center line C of the inner cylinder 52. Furthermore, both the pair of S/S terminals 441 has a predetermined length in a rotational direction (circumferential direction) of the inner cylinder 52.

A pair of ENT terminals 442 and a pair of EMA terminals 443 are arranged with an equal distance from the rotation center line C of the inner cylinder 52. In addition, distances of these four terminals from the rotation center line C of the inner cylinder 52 are equal to the distances of the three second contact portions 434 of the second movable terminal 433 from the rotation center line C of the inner cylinder 52.

One of the pair of S/S terminals 441, one of the pair of ENT terminals 442, and one of the pair of EMA terminals 443 are connected to the battery 24 through the battery power line 301. The other S/S terminal 441 is connected to the S/S signal receiver 211 of the ECM 21 through the S/S signal line 303. The other ENT terminal 442 is connected to the ENT signal receiver 311 of the keyless controller 31 through the ENT signal line 302. The other EMA terminal 443 is connected to the power receiving portion 212 of the ECM 21 through the ECM power line 304 (refer to FIG. 3).

If the movable terminal plate 43 is rotated with respect to the fixed terminal plate 44 in synchronization with the inner cylinder 52 as an exemplary common manipulating member 404, a rotational position relationship between the pair of S/S terminals 441 and the pair of first contact portions 432 is changed. In addition, if the movable terminal plate 43 is moved in the axial line direction with respect to the fixed terminal plate 44 in synchronization with the inner and outer cylinders 52 and 51, an axial positional relationship between the movable terminal plate 43 and the fixed terminal plate 44 is changed. Similarly, if the movable terminal plate 43 is rotated with respect to the fixed terminal plate 44 in synchronization with the inner cylinder 52, a rotational position relationship between the pair of ENT terminals 442, the pair of EMA terminals 443, and the three second contact portions 434 is changed. Furthermore, each of the S/S switch 401, the ENT switch 402, and the EMA switch 403 is switched between ON and OFF depending on the changes of the axial position relationship and the rotational position relationship between the movable terminal plate 43 and the fixed terminal plate 44. In this manner, the S/S switches 401, the ENT switch 402, and the EMA switch 403 are switched between ON and OFF on the basis of the rotation or the axial movement of the inner cylinder 52 as an exemplary common manipulating member 404.

<Switching Operation of Switch>

Figure 8A:
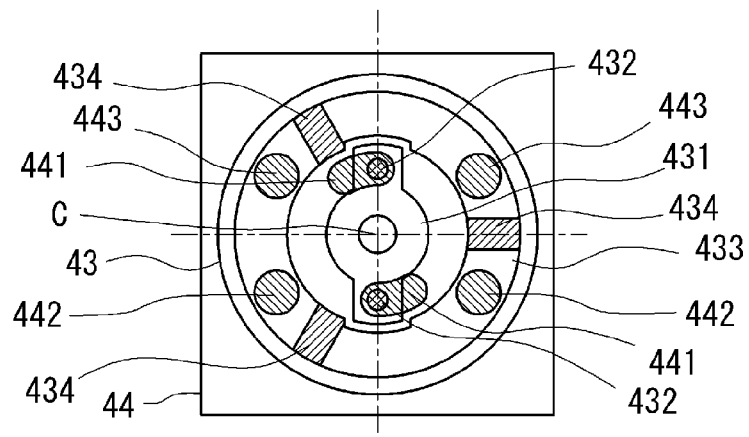
FIG. 8A is a diagram schematically illustrating a relationship between rotation of the movable terminal plate and ON/OFF operations of each switch as a diagram illustrating a positional relationship between the movable terminal plate and the fixed terminal plate when the inner cylinder is placed in the normal position.
Figure 8B:
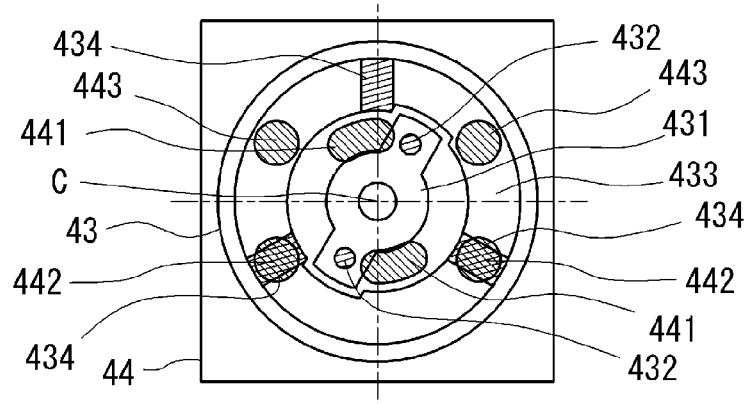
FIG. 8B is a diagram schematically illustrating a relationship between rotation of the movable terminal plate and ON/OFF operations of each switch as a diagram illustrating a state that the inner cylinder is placed in the entry position.
Figure 8C:
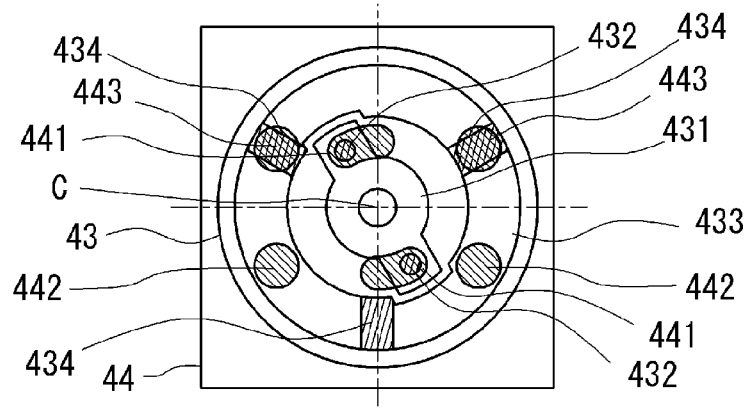
FIG. 8C is a diagram schematically illustrating a relationship between rotation of the movable terminal plate and ON/OFF operations of each switch as a diagram illustrating a state that the inner cylinder is placed in the emergency position.

Here, the rotation and the axial movement of the inner cylinder 52 and the movable terminal plate 43 and ON/OFF switching operations of each switch will be described with reference to FIGS. 8A to 8C. FIGS. 8A to 8C are diagrams schematically illustrating a relationship between the rotation of the movable terminal plate 43 and ON/OFF switching operations of each switch.

FIG. 8A illustrates a positional relationship between the movable terminal plate 43 and the fixed terminal plate 44 when the inner cylinder 52 is placed in the normal position. If the inner cylinder 52 is placed in the normal position, each of the pair of first contact portions 432 provided in the first movable terminal 431 is overlapped with each of the pair of S/S terminals 441 as seen from the rotation center line C of the inner cylinder 52. However, if the control knob 42 is not pressed, the pair of first contact portions 432 and the pair of S/S terminals 441 are separated in the axial line direction and are not electrically connected. For this reason, the S/S switch 401 is set to OFF. In addition, none of the three second contact portions 434 is overlapped with any one of the pair of ENT terminals 442 and the pair of EMA terminals 443. For this reason, both the ENT switch 402 and the EMA switch 403 are set to OFF. In this manner, if the inner cylinder 52 is placed in the normal position, and the movable terminal plate 43 is placed in the OUT-side end within a movable range of reciprocation, all of the S/S switch 401, the ENT switch 402, and the EMA switch 403 are set to OFF. If the control knob 42 is pressed and makes a rectilinear motion toward the IN side under this situation, the movable terminal plate 43 approaches the fixed terminal plate 44, and the pair of first contact portions 432 respectively make contact with the pair of S/S terminals 441. For this reason, the pair of S/S terminals 441 are electrically connected through the first movable terminal 431, and the S/S switch 401 is switched from OFF to ON.

FIG. 8B illustrates a state that the inner cylinder 52 is placed in the entry position. If the inner cylinder 52 is placed in the entry position, none of the pair of first contact portions 432 of the first movable terminal 431 is overlapped with the S/S terminal 441 as seen from the rotation center line C of the inner cylinder 52. For this reason, if the inner cylinder 52 is placed in the entry position, the S/S switch 401 is set to OFF regardless of whether or not the control knob 42 is pressed toward the IN side. In addition, if the inner cylinder 52 is placed in the entry position, two second contact portions 434 out of the three second contact portions 434 respectively make contact with the pair of ENT terminals 442. Under this situation, the pair of ENT terminals 442 is electrically connected to each other through the second movable terminal 433. For this reason, the ENT switch 402 is switched to ON. However, the remaining second contact portion 434 makes contact with none of the pair of EMA terminals 443. For this reason, the EMA switch 403 is set to OFF.

FIG. 8C illustrates a state that the inner cylinder 52 is placed in the emergency position. If the inner cylinder 52 is placed in the emergency position, the pair of first contact portions 432 of the first movable terminal 431 is respectively overlapped with the pair of S/S terminals 441 as seen from the rotation center line C of the inner cylinder 52. For this reason, the control knob 42 is pressed toward the IN side and makes a rectilinear motion. As a result, the S/S switch 401 is switched from OFF to ON. Note that the pair of S/S terminals 441 has a predetermined length in a rotational direction, and the pair of first contact portions 432 of the first movable terminal 431 is respectively overlapped with the pair of S/S terminals 441 in any position of the inner cylinder 52 from the normal position to the emergency position. In addition, two of the three second contact portions 434 respectively make contact with the pair of EMA terminals 443. For this reason, the EMA switch 403 is set to ON. Meanwhile, the remaining one of the three second contact portions 434 makes contact with none of the pair of ENT terminals 442. For this reason, the ENT switch 402 is set to OFF. In this manner, as the inner cylinder 52 is moved from the normal position to the emergency position, the S/S switch 401 and the ENT switch 402 are maintained in OFF, and the EMA switch 403 is switched to ON. In addition, if the movable terminal plate 43 approaches the fixed terminal plate 44 while the inner cylinder 52 is placed in the emergency position, the S/S switch 401 is switched to ON.

In this manner, the switch device 4 according to this embodiment can make three different mechanical motions including a mechanical motion of the inner cylinder 52 rotated from the normal position to the entry position, a mechanical motion of the inner cylinder 52 rotated from the normal position to the emergency position, and a mechanical motion of the inner cylinder 52 and the outer cylinder 51 moving in the axial line direction with respect to the switch casing 41. In addition, the three mechanical motions can be allocated to the ON/OFF switching operations of the three switches. That is, the three switches are switched between ON and OFF on the basis of the rotation or the axial movement of the inner cylinder 52 as an exemplary common manipulating member 404. Note that the direction of the mechanical motion for switching the S/S switch 401 and the directions of the mechanical motion for switching the ENT switch 402 and the mechanical motion for switching the EMA switch 403 are different from each other. Furthermore, although both the mechanical motion for switching the ENT switch 402 and the mechanical motion for switching the EMA switch 403 are rotational motions, they have opposite directions.

Here, manipulation of the switch device 4 and processing of the keyless controller 31 in response to the manipulation will be described. The inner cylinder 52 of the pin cylinder lock 5 of the switch device 4 according to this embodiment is maintained in the normal position when there is no external manipulation. If a user rotates the control knob 42 in a predetermined direction, the inner cylinder 52 is rotated in synchronization with the control knob 42 from the normal position to the entry position. Then, as illustrated in FIG. 8B, the ENT switch 402 is switched from OFF to ON. The keyless controller 31 activates the ECM 21 through the operation described above and transitions the engine 25 to the engine controllable state.

Then, a user returns the inner cylinder 52 to the normal position along with the control knob 42 and presses the control knob 42 to the IN side in order to start the engine 25 of the outboard motor 2. If the control knob 42 is pressed to make a rectilinear motion toward the IN side while the inner cylinder 52 is placed in the normal position, the movable terminal plate 43 and the fixed terminal plate 44 approach each other. In addition, the pair of S/S terminals 441 are electrically connected through the first movable terminal 431, and the S/S switch 401 is switched to ON. If it is detected that the S/S switch 401 is switched from OFF to ON while the engine 25 of the outboard motor 2 stops, the ECM 21 switches the starter relay switch 23 to ON to activate the starter motor 22 and start the engine 25.

In this manner, using the switch device 4 according to this embodiment, it is possible to activate the ECM 21 and start the engine 25 of the outboard motor 2 by manipulating the control knob 42 to rotate without a mechanical key 501. Note that the S/S switch 401 is maintained in OFF even when the control knob 42 is pressed toward the IN side if the inner cylinder 52 is placed in the entry position as illustrated in FIG. 8B. In addition, if the inner cylinder 52 is not returned from the entry position to the normal position, it is impossible to switch the S/S switch 401 to ON and start the engine 25. In this manner, according to this embodiment, the direction of moving the control knob 42 and the inner cylinder 52 in order to execute the authentication process in the keyless controller 31 is different from the direction of moving the control knob 42 and the inner cylinder 52 in order to start the engine 25. Furthermore, the S/S switch 401 is not switched to ON in the entry position in which the keyless controller 31 executes the authentication process.

In this configuration, it is possible to guarantee a time necessary for the keyless controller 31 to complete the authentication process. That is, in the authentication process, the keyless controller 31 transmits or receives a signal containing ID information to or from the portable unit and the like 34 or the ECM 21, computes a combination of ID information and a distance of the portable unit and the like 34, and switches the ECM 21 to the controllable state of the engine 25 depending on the result of the computation. For this reason, a certain period of time is necessary in order to complete the authentication process after it is detected that the ENT switch 402 is switched to ON. In this case, if the S/S switch 401 can be in ON while the inner cylinder 52 is placed in the entry position, a user may switch the S/S switch 401 to ON within a very short time or immediately after the ENT switch 402 is switched to ON. In this case, it is impossible to guarantee the time for completing the authentication process. In this regard, according to this embodiment, the S/S switch 401 is not switched to ON while the inner cylinder 52 is placed in the entry position. In addition, the S/S switch 401 is not switched to ON if the inner cylinder 52 is not returned to the normal position. As a result, it is possible to guarantee the time necessary to complete the authentication process.

The control knob 42 is detachably installed to the inner cylinder 52. If the control knob 42 is removed from the inner cylinder 52, the OUT-side end face of the inner cylinder 52 is exposed so as to allow access to the keyhole 521. It is possible to rotate the inner cylinder 52 from the normal position to the emergency position by inserting a suitable mechanical key 501 to the keyhole 521 provided in the inner cylinder 52. As the inner cylinder 52 moves from the normal position to the emergency position, the EMA switch 403 is switched from OFF to ON, so that the power output from the battery 24 is supplied to the ECM 21, and the ECM 21 is activated. If the inner cylinder 52 is pressed to make a rectilinear motion to the IN side under this situation, the movable terminal plate 43 and the fixed terminal plate 44 approach each other, and the S/S switch 401 is switched from OFF to ON. If it is detected that the S/S switch 401 is switched to ON, the ECM 21 switches the starter relay switch 23 to ON and activates the starter motor 22 to start the engine 25. In this manner, a user can start the engine 25 by using the suitable mechanical key 501 even when the user does not possess the portable unit and the like 34 or when the portable unit and the like 34 is not available.

<Statistics of Functional Effects>

According to this embodiment, each of the ON/OFF switching operations of the S/S switch 401, the ENT switch 402, and the EMA switch 403 can be performed by a mechanical motion of the single inner cylinder 52. That is, a plurality of switches are switched between ON and OFF on the basis of the mechanical motion of the single common member. In this configuration, compared to a configuration in which each of the plurality of switches has a member for switching between ON and OFF, it is possible to reduce the number of components of the switch device 4. Therefore, it is possible to miniaturize the switch device 4. In addition, according to this embodiment, all of the terminals of the switches are provided in the pair of the movable terminal plate 43 and the fixed terminal plate 44. For this reason, compared to a configuration in which each switch independently has the movable terminal plate 43 and the fixed terminal plate 44, it is possible to reduce the number of components. Therefore, it is possible to miniaturize the switch device 4. In addition, by miniaturizing the switch device 4, it is possible to facilitate mounting of the switch device 4 to the remote control box 13.

In order to mount the remote handset system 3 to the control system of the outboard motor 2, it is necessary to arrange the ENT switch 402 and the EMA switch 403 in the remote control box 13. For this reason, it is necessary to provide a space for these switches in the remote controller housing 131. However, in the side-mount type remote control box, since a space for mounting the switch device and the like in the remote controller housing 131 is particularly small, it is more difficult to mount the switch device for the remote handset system. In contrast, according to this embodiment, since it is possible to miniaturize the switch device 4 having the ENT switch 402 and the EMA switch 403, it is possible to facilitate arrangement of the switch device and the like in the side-mount type remote control box. Therefore, it is possible to mount the remote handset system 3 even in the outboard motor 2 having the side-mount type remote control box.

According to this embodiment, it is possible to guarantee a certain period of time to set the S/S switch 401 to ON after the ENT switch 402 is set to ON. In the remote handset system 3, if it is detected that the ENT switch 402 is switched from OFF to ON, the keyless controller 31 executes the authentication process. Then, a certain period of time is necessary to complete the authentication process and allows the ECM 21 to have an engine controllable state. For this reason, if the S/S switch 401 can be set to ON when the ENT switch 402 is set to ON, the S/S signal may be transmitted in advance before the ECM 21 has the engine controllable state. This may generate a failure to start the engine 25 of the outboard motor 2. According to this embodiment, the direction of the mechanical motion for the ON/OFF switching operation is set to be different between the ENT switch 402 and the S/S switch 401, and the S/S switch 401 is not switched to ON while the ENT switch 402 is in the ON position. In this configuration, it is possible to prevent the ENT switch 402 and the S/S switch 401 from being switched to ON simultaneously or successively within a very short time. Therefore, it is possible to guarantee the time necessary to complete the authentication process and reliably start the engine 25.

According to this embodiment, it is possible to switch the ENT switch 402 from OFF to ON by rotating the inner cylinder 52 from the normal position in one predetermined direction and switch the EMA switch 403 by rotating the inner cylinder 52 oppositely to the one predetermined direction from the normal position. In addition, in order to switch the EMA switch 403 from OFF to ON, the suitable mechanical key 501 is necessary. In this configuration, it is possible to prevent the EMA switch 403 from being switched from OFF to ON by an erroneous manipulation. For example, when the EMA switch 403 is switched from OFF to ON for security purposes once, the use of the outboard motor 2 may be inhibited without performing a special manipulation for the ECM 21 thereafter. In this configuration, if the EMA switch 403 is switched to ON by an erroneous manipulation, the subsequent start manipulation of the engine 25 becomes complicated, and it takes more time to start the engine 25 than a normal case. According to this embodiment, since the switching of the EMA switch 403 from OFF to ON by an erroneous manipulation is prevented, it is possible to prevent such a problem.

The opening of the keyhole 521 for manipulating the EMA switch 403 is covered by the control knob 42. In this configuration, it is possible to improve an anti-theft capability. In addition, it is possible to prevent a foreign object from intruding to the keyhole 521. Furthermore, since the keyhole 521 is concealed, it is possible to improve a visual aspect of the switch device 4.

According to this embodiment, the locking concave portion 522 provided in one of the inner cylinder 52 and the control knob 42 and the locking convex portion 422 provided in the other one lockably to the locking concave portion 522 serve as a removal prevention mechanism of the control knob 42. In this configuration, it is possible to prevent losing of the control knob 42 and a failure to manipulate the switch device 4 due to the lost control knob 42. In addition, if the removal prevention mechanism has such a configuration, a separate tool for installing and uninstalling (particularly, removing) the control knob 42 is not necessary. For this reason, it is possible to rapidly manipulate the EMA switch 403 in emergency.

While preferred embodiments of the invention have been described and illustrated hereinbefore, it should be understood that they are only for exemplary purposes and are not to be construed as limitations. Any addition, omission, substitution, or modification may be possible without departing from the spirit or scope of the present invention.

For example, although the side-mount type remote control box has been described in the embodiment described above, the remote control box is not limited to such a type. For example, the present invention can also be applied to a top-mount type remote control box.

The present invention relates to a technology effective for an outboard motor switch device having remote handset system. According to the present invention, three switches can be integrated into a single switching casing. Therefore, it is possible to miniaturize the switch device. For this reason, it is possible to facilitate mounting of the switch device to the remote control box. Therefore, it is possible to facilitate mounting of the remote handset system to the outboard motor.

According to the present invention, the entry switch and the start/stop switch are manipulated using a common manipulating member. Therefore, it is possible to reduce the number of components and miniaturize the switch device. In addition, it is possible to save a space for arranging the entry switch and the start/stop switch.

Since the emergency power switch switched between ON and OFF on the basis of the rotation of the single common manipulating member is further provided, it is possible to manipulate the entry switch, the start/stop switch, and the emergency power switch using the common manipulating member. As a result, even when the emergency power switch is included, it is possible to reduce the number of components and miniaturize the switch device.

What is claimed is:

1. An outboard motor switch device having a remote handset system, comprising:
   an entry switch configured to allow the remote handset system to perform an authentication process;
   a start/stop switch configured to manipulate start and stop of an engine;
   an emergency power switch; and
   a single common manipulating member configured to perform:
     an ON/OFF switching operation of the entry switch,
     an ON/OFF switching operation of the start/stop switch, and
     an ON/OFF switching operation of the emergency power switch,
   wherein the entry switch and the emergency power switch are switched between ON and OFF on the basis of a rotation of the single common manipulating member,
   wherein an operational direction of the single common manipulating member is different between the ON/OFF switching operation of the entry switch and the ON/OFF switching operation of the emergency power switch,
   wherein the start/stop switch is switched between ON and OFF on the basis of a rectilinear motion of the manipulating member, and
   wherein the start/stop switch is switched between ON and OFF when the manipulating member makes a rectilinear motion in a case where the single common manipulating member is rotated to set the emergency power switch to ON.

2. An outboard motor switch device having a remote handset system, comprising:
   an entry switch configured to allow the remote handset system to perform an authentication process;
   a start/stop switch configured to start and stop an engine;
   an emergency power switch;
   a pin cylinder lock having an outer cylinder and an inner cylinder provided with a keyhole where a mechanical key can be inserted or removed and rotatably housed in the outer cylinder; and
   a single common manipulating member, comprises the inner cylinder, and is configured to perform:
     an ON/OFF switching operation of the entry switch,
     an ON/OFF switching operation of the start/stop switch, and
     an ON/OFF switching operation of the emergency power switch,
   wherein the emergency power switch is switched between ON and OFF on the basis of a rotation of the single common manipulating member,
   wherein an operational direction of the single common manipulating member is different between the ON/OFF switching operation of the entry switch and the ON/OFF switching operation of the emergency power switch,
   wherein the inner cylinder is allowed to rotate in one predetermined direction from a mechanical key insertable/removable position and is not allowed to rotate oppositely to the one predetermined direction when the mechanical key is not inserted into the keyhole,
   wherein the inner cylinder is allowed to rotate in the opposite direction from the insertable/removable position when the key is inserted into the keyhole, wherein the entry switch is switched from OFF to ON when the inner cylinder is rotated in the one predetermined direction from the mechanical key insertable/removable position, and wherein the emergency power switch is switched from OFF to ON when the inner cylinder is rotated in the opposite direction from the mechanical key insertable/removable position.

3. The outboard motor switch device having the remote handset system according to claim 2, further comprising a control knob detachably installed in the inner cylinder to cover the keyhole and rotate in synchronization with the inner cylinder.

4. The outboard motor switch device having the remote handset system according to claim 3, further comprising a removal prevention mechanism for preventing the control knob from being removed from the inner cylinder.

5. The outboard motor switch device having the remote handset system according to claim 4, wherein the removal prevention mechanism has a trench-shaped locking concave portion provided in any one of the cylinder lock and the control knob and a locking convex portion provided in the other one lockably to the locking concave portion.

* * * * *